(12) United States Patent
Dobbins (10) Patent No.: US 11,752,667 B2
(45) Date of Patent: Sep. 12, 2023

(54) TIRE MOLD MAINTENANCE AND REPAIR SYSTEMS AND RELATED METHODS

(71) Applicant: Jeanette Dobbins, Elm City, NC (US)

(72) Inventor: Terry Phillip Dobbins, Elm City, NC (US)

(*) Notice: Subject to any disclaimer, the term of this patent is extended or adjusted under 35 U.S.C. 154(b) by 0 days.

(21) Appl. No.: 18/074,943

(22) Filed: Dec. 5, 2022

(65) Prior Publication Data

US 2023/0173717 A1 Jun. 8, 2023

Related U.S. Application Data

(60) Provisional application No. 63/285,588, filed on Dec. 3, 2021.

(51) Int. Cl.
*B29C 33/74* (2006.01)
*B29D 30/06* (2006.01)

(52) U.S. Cl.
CPC .......... *B29C 33/74* (2013.01); *B29D 30/0606* (2013.01)

(58) Field of Classification Search
CPC .......................... B29C 33/74; B29D 30/0606
See application file for complete search history.

(56) References Cited

U.S. PATENT DOCUMENTS

| 3,741,696 A | 6/1973 | Greenwood |
| 3,905,155 A | 9/1975 | Smith et al. |
| 10,603,857 B2 | 3/2020 | Furutani et al. |
| 2011/0183022 A1* | 7/2011 | Takagi ............... B29D 30/0606 425/47 |

FOREIGN PATENT DOCUMENTS

| CN | 201423576 Y | 3/2010 |
| CN | 204430858 U | 7/2015 |
| CN | 105234718 A | 1/2016 |
| CN | 105234719 A | 1/2016 |
| CN | 105598725 A | 5/2016 |
| CN | 109049432 A | 12/2018 |

OTHER PUBLICATIONS

Huai'an Kingred CNC Technology, Tire Mold EDM CNC1670T, 2021, retrieved on Nov. 12, 2021 from http://www.kingedms.com/tire-mold-edm/cnc1670/.

* cited by examiner

*Primary Examiner* — Rick K Chang
(74) *Attorney, Agent, or Firm* — Olive Law Group, PLLC (57) ABSTRACT

Tire mold maintenance and repair systems and related methods are disclosed. According to an aspect, a mold maintenance and repair system includes a mold holder. The mold holder is configured to releasably attach to a support structure and to hold a mold. The mold comprises contoured upper portion for molding an item and an attachment lower portion for attaching to the mold holder.

14 Claims, 10 Drawing Sheets

TIRE MOLD MAINTENANCE AND REPAIR SYSTEMS AND RELATED METHODS

CROSS REFERENCE TO RELATED APPLICATION

This application claims priority to U.S. Provisional Patent Application No. 63/285,588, filed Dec. 3, 2021, and titled TIRE MOLD MAINTENANCE AND REPAIR SYSTEMS AND RELATED METHODS, the content of which is incorporated herein by reference in its entirety.

TECHNICAL FIELD

The presently disclosed subject matter relates generally to mold repair and maintenance. Particularly, the presently disclosed subject matter relates to tire mold maintenance and repair systems and methods.

BACKGROUND

Tire mold cleaning and repair is a major concern for manufacturers and retreaders. Tire molds should be kept free of fouling—rubber leftovers such as chemical reactions of sulfur and zinc oxide occurring under heat and pressure. As an example, proper finishing of the tire bead surface is needed so that it seals on the wheel. Also, it is necessary to have clear, crisp, and legible Department of Transportation alpha-numeric characters as required by law. Further, crisp and precise logo and lettering is needed as it is a customers' focus area for initial perception of a tire's quality. Mold vents and micro valves should be clear of rubber extrusions and "whiskers". Surfaces between mold sections should be free of residue build-up. Segmented mold sections should mate together even under extreme press squeeze. It is desired to have reduced mechanical loads on fasteners attaching the segments and sidewall rings to the press. Further, there should be no tire surface irregularities due to each one and all of these imperfections during the curing operation A variety of processes have been developed to maintain and repair tire molds. For example, repairers can use welding, cleaning, ablation, tracking, heat treating, lasers, finishing, preventatives, and plating. However, there is a continuing need for improved and more efficient systems and techniques for tire mold cleaning and repair.

BRIEF DESCRIPTION OF THE DRAWINGS

Having thus described the presently disclosed subject matter in general terms, reference will now be made to the accompanying Drawings, which are not necessarily drawn to scale, and wherein:

SUMMARY

The presently disclosed subject matter includes tire mold maintenance and repair systems and related methods. According to an aspect, a mold maintenance and repair system includes a mold holder. The mold holder is configured to releasably attach to a support structure and to hold a mold. The mold comprises contoured upper portion for molding an item and an attachment lower portion for attaching to the mold holder.

According to another aspect, a mold maintenance and repair system includes a support structure. The support structure is configured to support one or more mold holders. Further, the system includes a mold holder configured to releasably attach to the support structure and to hold a mold. The mold comprises contoured upper portion for molding an item and an attachment lower portion for attaching to the mold holder.

According to another aspect, a method for mold maintenance and repair includes providing a mold holder. The method also includes attaching the mold holder to a support structure. Further, the method includes attaching a mold to the mold holder. Further, the mold comprises a contoured upper portion for molding an item.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

Disclosed herein are mold maintenance and repair systems and related methods. According to another aspect, the system includes a support structure. The support structure is configured to support one or more mold holders. Further, the system includes a mold holder configured to releasably attach to the support structure and to hold a mold. The mold comprises contoured upper portion for molding an item and an attachment lower portion for attaching to the mold holder.

Figure 1:
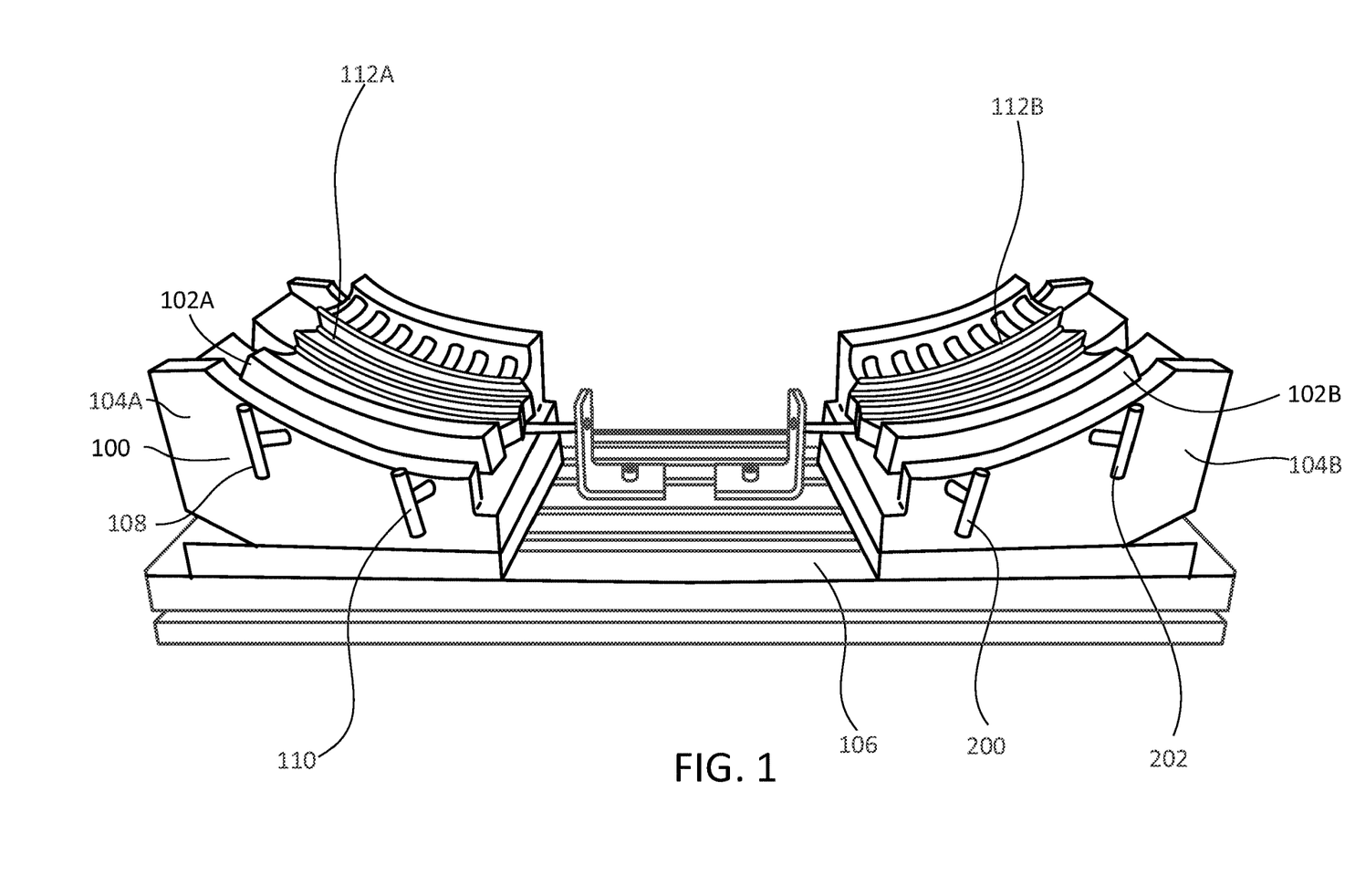
FIG. 1 is side perspective view of a mold maintenance and repair system 100 in accordance with embodiments of the present disclosure.

FIG. 1 illustrates side perspective view of a mold maintenance and repair system 100 in accordance with embodiments of the present disclosure. In this example, the system 100 is configured for maintenance and repair of tire molds, but it should be appreciated that the system 100 may alternatively be used for other types of molds. Referring to FIG. 1, the system 100 is holding a tire mold that includes sections 102A and 102B. The tire mold sections 102A and 102B are held and secured in place by mold holders 104A and 104B, respectively. The mold holders 104A and 104B may be secured to a suitable support structure 106. In this example, the support structure 106 is a mill table. While secured in place, repair and maintenance to the mold sections 102A and 102B may be conveniently performed.

Figure 2:
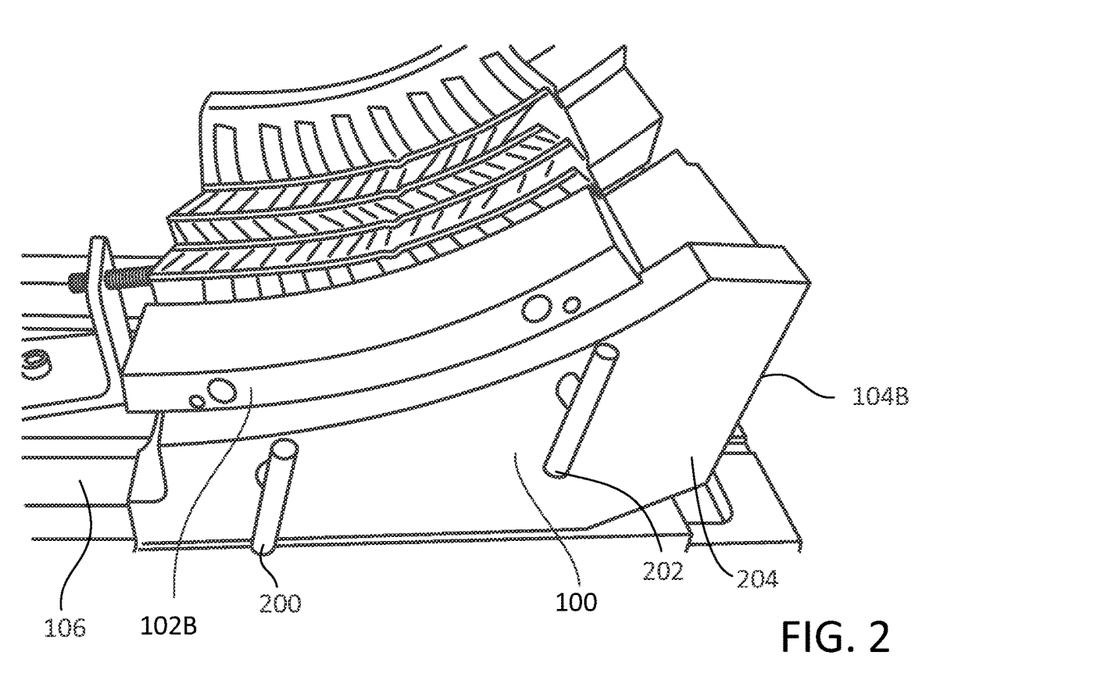
FIG. 2 is another side view showing the tire mold section shown in FIG. 1 and its associated mold holder in close-up.

FIG. 2 illustrates another side view showing the tire mold section 102B shown in FIG. 1 and its associated mold holder 104B in close-up. Referring to FIG. 2, the mold holder 104B includes a pair of handles 200 and 202 attached to a near side 204. A similar pair of handles (not shown) may be attached to a side of the mold holder 104B that opposes the near side 204. The mold holder 104A shown in FIG. 1 can have a similar pair of handles 108 and 110. The handle pair 108, 110 and the handle pair 200, 202 may be used for lifting and moving the mold holders 104A and 104B, respectively, when the mold holders 104A and 104B are detached from the support structure 106.

With continuing reference to FIGS. 1 and 2, the mold sections 102A and 102B include contoured upper portions 112A and 112B, respectively, for molding a portion of a tire or other item. As can be understood by those of skill in the art, the contoured upper portions 112A and 112B are shaped and sized for defining tire treads. Alternatively, the contoured upper portions 112A and 112B can be shaped and sized for defining other features of an item as desired.

The system 100 operates to hold the contoured upper portions 112A and 112B such that an operator can work on these exposed portions for repair and maintenance. As shown, the upper portions 112A and 112B face upward such that the operator can easily work on them. Example repairs and maintenance include, but are not limited to, welding, cleaning, ablation, tracking, heat treating, lasers, finishing, preventatives, and plating.

Figure 3:
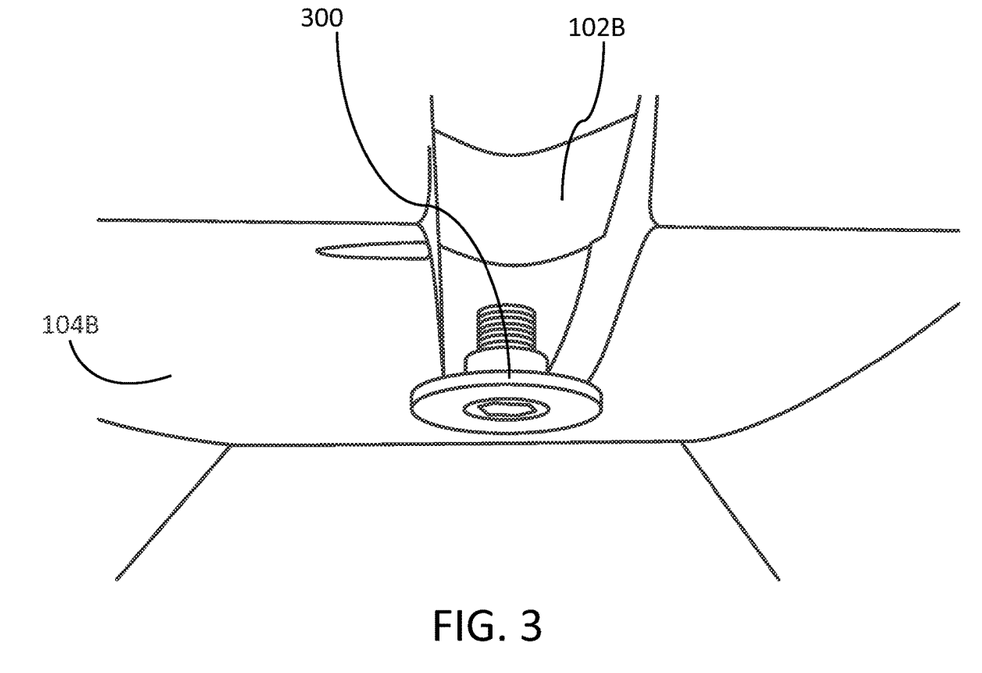
FIG. 3 is a rear, perspective view showing a close-up of a back portion of the system.

FIG. 3 illustrates a rear, perspective view showing a close-up of a back portion of the system 100. Referring to FIG. 3, a bolt 300 is used for holding section 102B to the mold holder 104B. The bolt 300 can be removed for at least partially releasing section 102B from the mold holder 104B.

Figure 4:
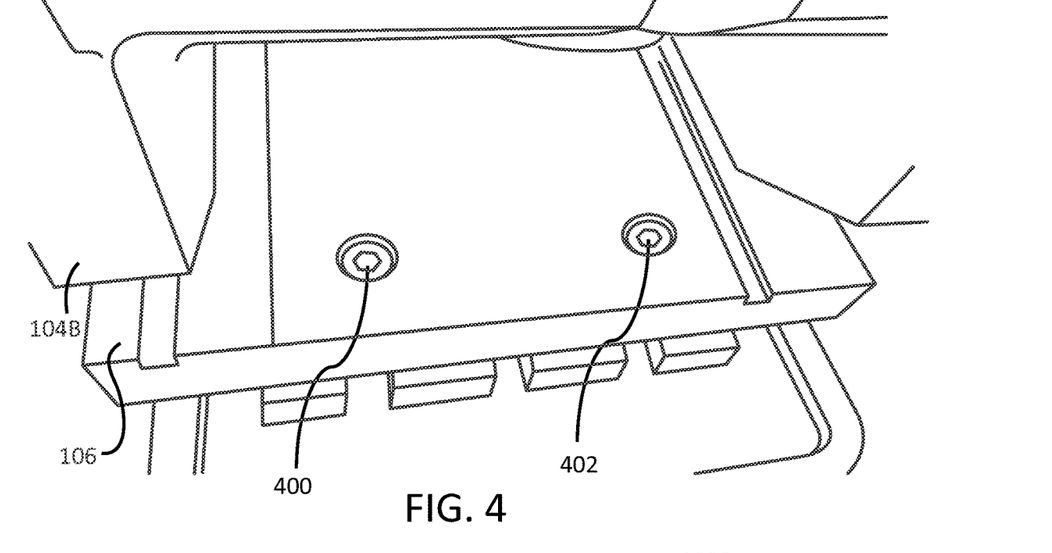
FIG. 4 is another rear, perspective view showing a close-up of a back portion of the system.

FIG. 4 illustrates another rear, perspective view showing a close-up of a back portion of the system 100. Referring to FIG. 4, bolts 400 and 402 are used for holding mold holder 104B to the support structure 106. The bolts 400 and 402 can be removed for at least partially releasing section 104B from the support structure 106.

Figure 5:
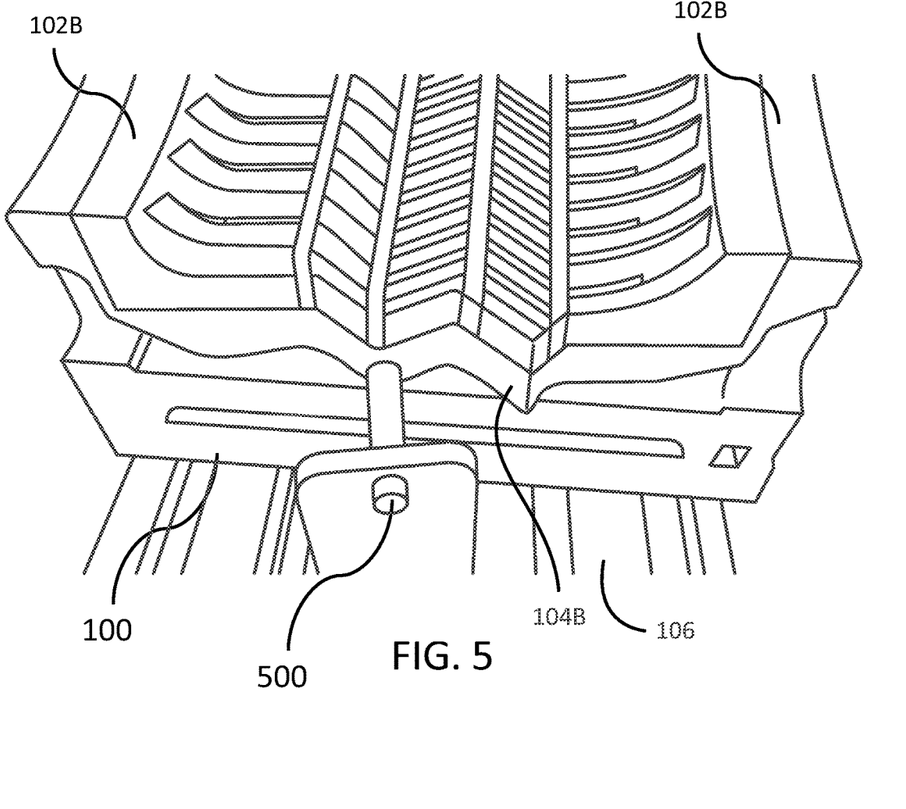
FIG. 5 is a front, perspective view showing a close-up of a front portion of the system.

FIG. 5 illustrates a front, perspective view showing a close-up of a front portion of the system 100. Referring to FIG. 5, a bolt 500 is attached forward from the section 102B. In this position, the bolt 500 holds the section 102B in position with respect to the support structure 106 to prevent it from sliding with respect to the support structure 106.

Figure 6:
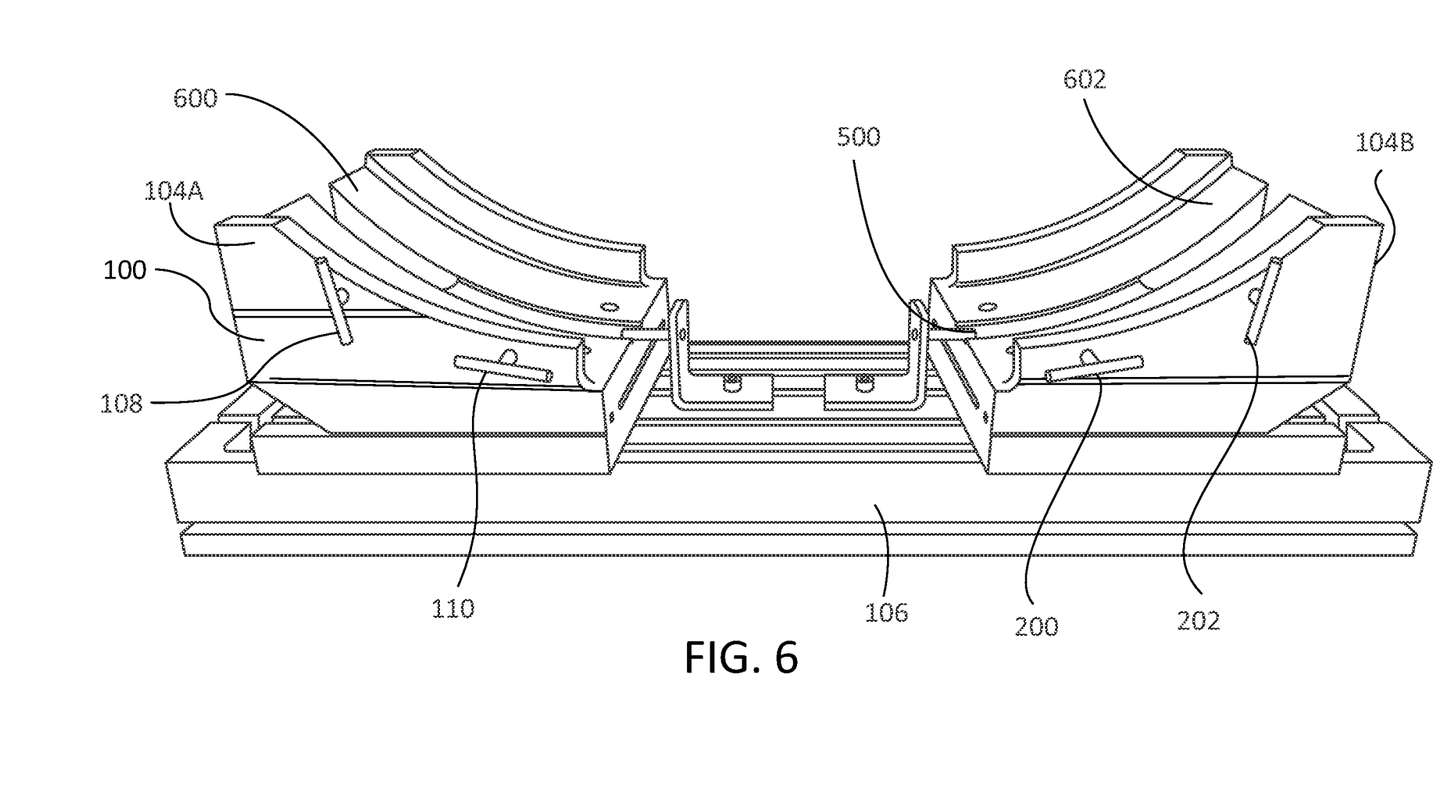
FIG. 6 is a side perspective view of the system without the tire mold sections being attached to mold holders.

FIG. 6 illustrates a side perspective view of the system 100 without the tire mold sections 102A and 102B being attached to mold holders 104A and 104B, respectively. Referring to FIG. 6, with the tire mold sections 102A and 102B removed top surfaces 600 and 602 can be viewed. Surfaces 600 and 602 are generally curved in shaped for fitting to their respective mold sections, although it is noted that the surface can have any other suitable shape for holding mold sections or other items.

Figure 7:
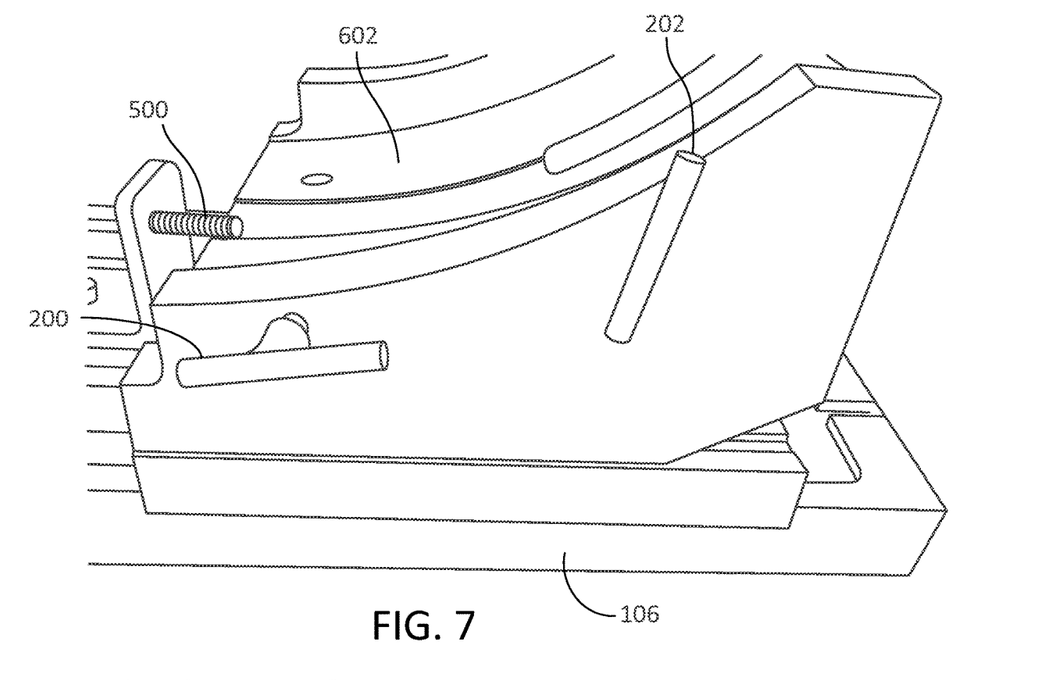
FIG. 7 is another side view showing the tire mold section without the mold holder 104B attached in close-up.

FIG. 7 illustrates another side view showing the tire mold section 102B without the mold holder 104B attached in close-up.

Figure 8:
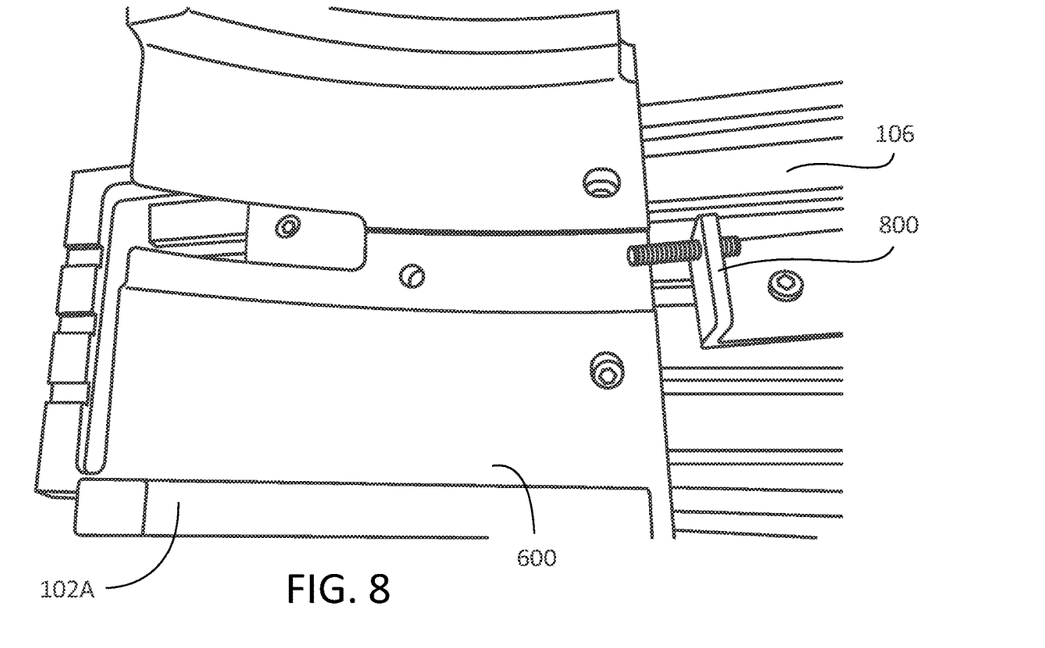
FIG. 8 is a top perspective view of the tire mold section without the mold holder attached in close-up.

FIG. 8 illustrates a top perspective view of the tire mold section 102A without the mold holder 104B attached in close-up. Referring to FIG. 8, a bolt 800 is attached forward from the section 102A for holding the section 102A in position with respect to the support structure 106 to prevent it from sliding with respect to the support structure 106.

Figure 9:
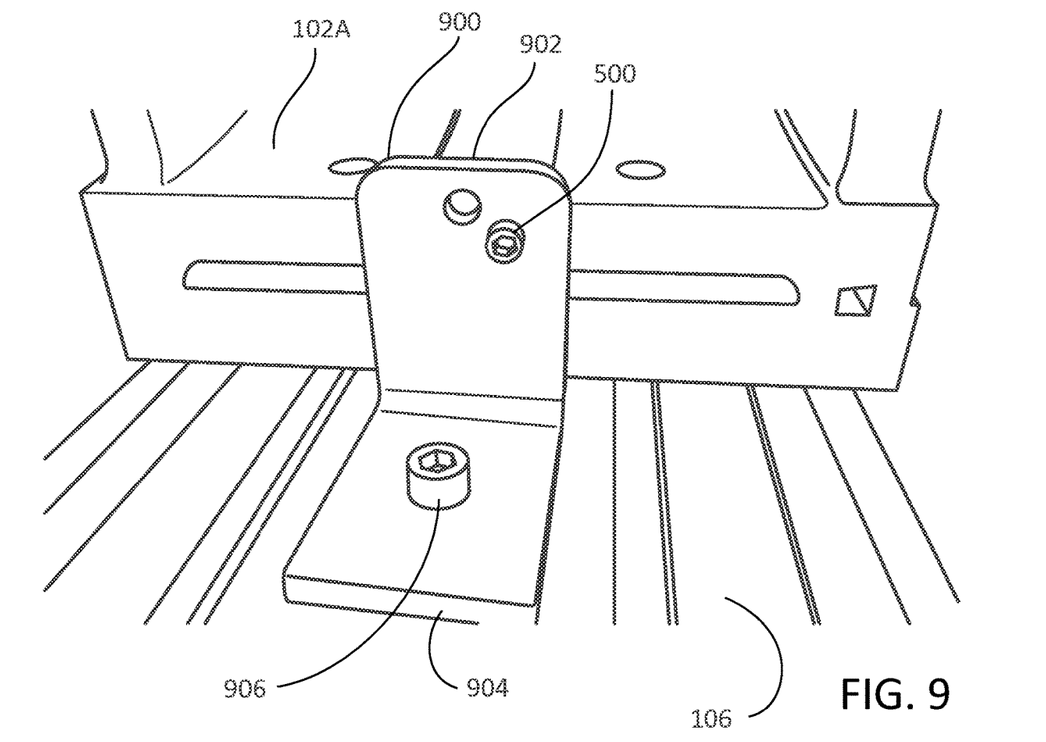
FIG. 9 is a front view of the tire mold section without the mold holder attached in close-up.

FIG. 9 illustrates a front view of the tire mold section 102A without the mold holder 104B attached in close-up. Referring to FIG. 9, a bracket 900 is provided and attached to the bolt 500 at the bracket's 500 upper portion 902. A lower portion 904 of the bracket is secured to the support structure 106 via another bolt 906. As a result, the tire mold section 102A can be held firmly to the support structure 106.

Figure 10:
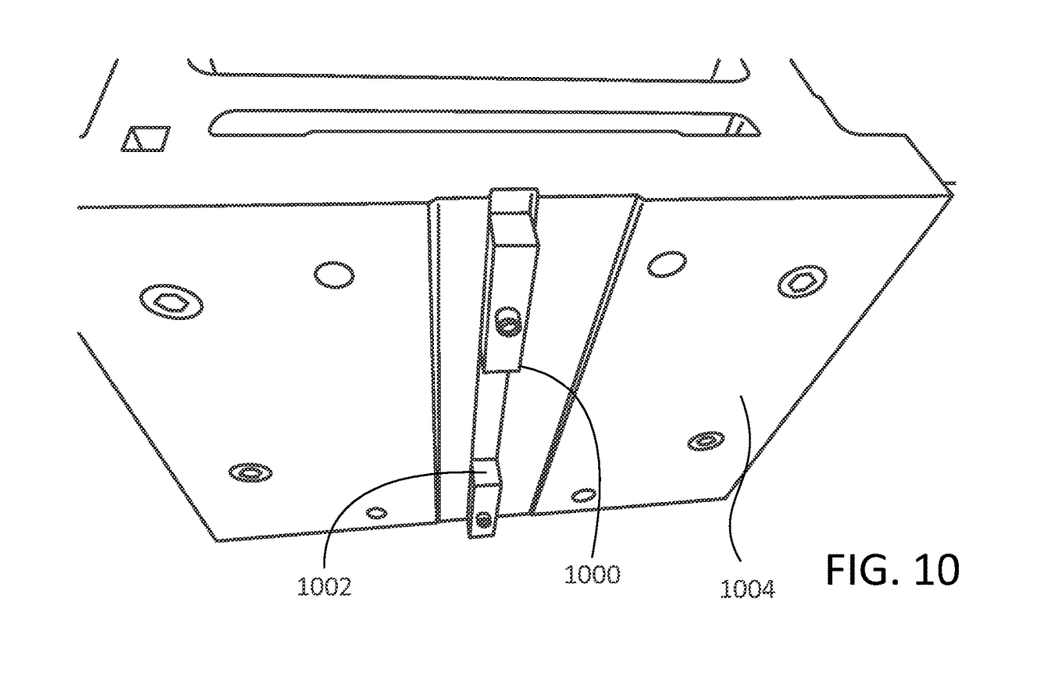
FIG. 10 is a bottom perspective view of the mold holder.

FIG. 10 illustrates a bottom perspective view of the mold holder 104B. Referring to FIG. 10, the mold holder 104B includes features 1000 and 1002 that extend downward from a flat bottom surface 1004. The features 1000 and 1002 are aligned in this example but may alternatively be in any other configuration for providing stability to attachment to the support structure 106 (not shown). In this example, the features 1000 and 1002 are shaped and sized for fitting to grooves in the support structure 106, which is a mill table in this example.

Figure 11:
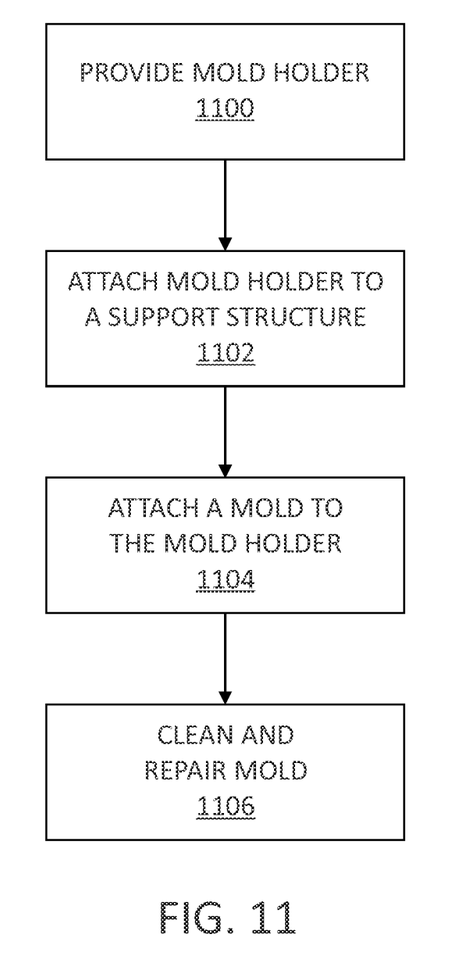
FIG. 11 is a flow diagram of a method for mold maintenance and repair in accordance with embodiments of the present disclosure.

In accordance with embodiments, a method for mold maintenance and repair can include providing and using a system as disclosed herein. For example, the mold maintenance and repair system 100 described with respect to FIGS. 1-10 or a similar system may be utilized. FIG. 11 illustrates a flow diagram of a method for mold maintenance and repair in accordance with embodiments of the present disclosure. For the example of FIG. 11, reference is made to the system 100 but it should be appreciated that any other suitable system may be utilized.

Referring to FIG. 11, the method includes providing 1100 a mold holder. For example, one or both of the mold holders 104A and 104B shown in FIGS. 1-10 can be provided. The mold holders 104A, 104B may initially be detached from the support structure 106.

The method of FIG. 11 can include attaching 1102 the mold holder to a support structure. Continuing the aforementioned example, the support structure 106, such as a mill table, can be cleaned of debris. An appropriate cleaning fluid may be used and applied by a cloth. Mold holders 104A, 104B may be attached to the support structure 106. For example, T-blocks in a mill table may be utilized. In addition, mold holders 104A, 104B may be cleaned and debris removed. Subsequently, aforementioned bolts may be attached and tightened for affixing the mold holders 104A, 104B to the support structure 106. A dial indicator may be used to verify alignment of mold holders 104A, 104B.

The method includes attaching 1104 a mold to the mold holder. The mold defines a contoured upper portion for molding an item. Continuing the aforementioned example, molds 102A and 102B can be attached to mold holders 104A and 104B, respectively.

The method includes repairing and cleaning 1106 the mold. Continuing the aforementioned example, the attached mold 102A and/or mold 102B can be cleaned and repair. Debris may be removed from the tread and a cleaner used.

Figure 12:
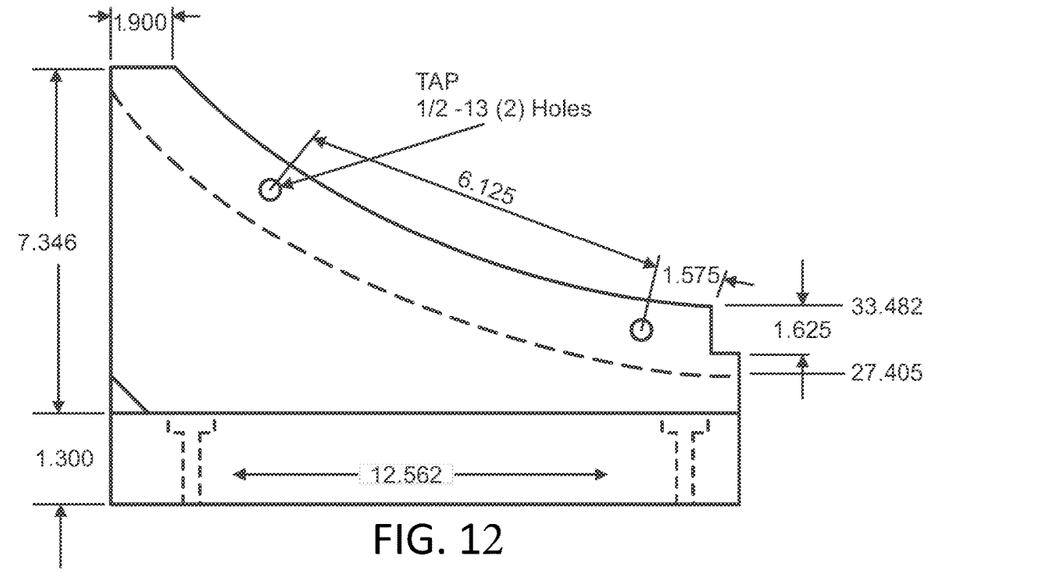
FIGS. 12-17 are schematic diagrams showing example dimensions of a tire mold maintenance and repair system in accordance with embodiments of the present disclosure.
Figure 13:
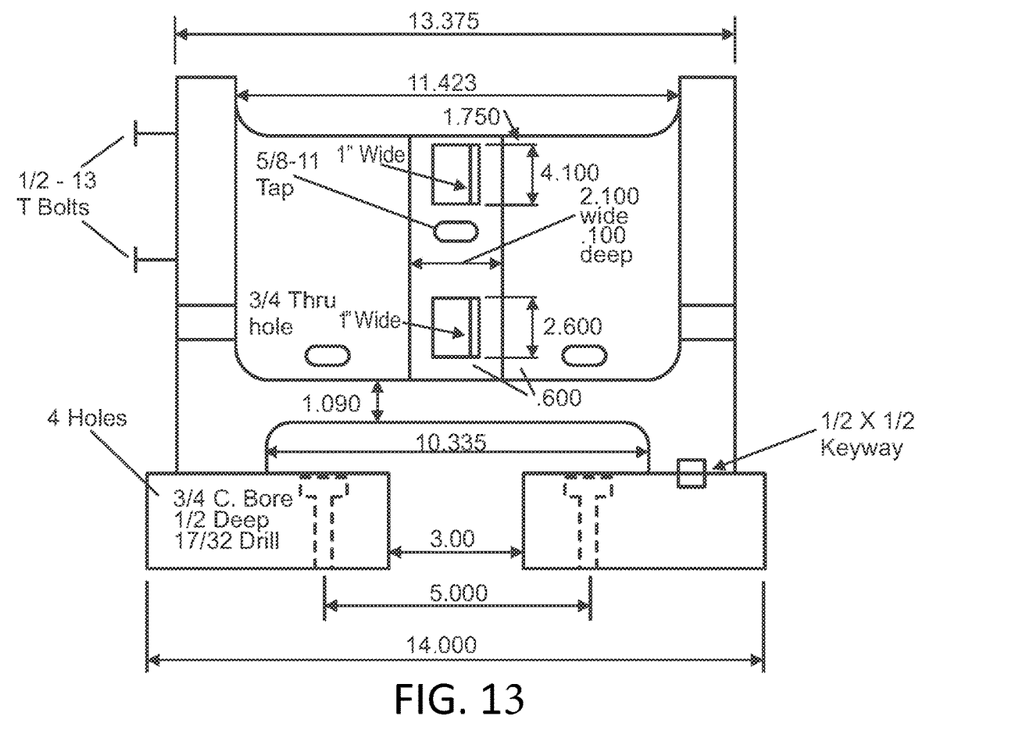
Figure 14:
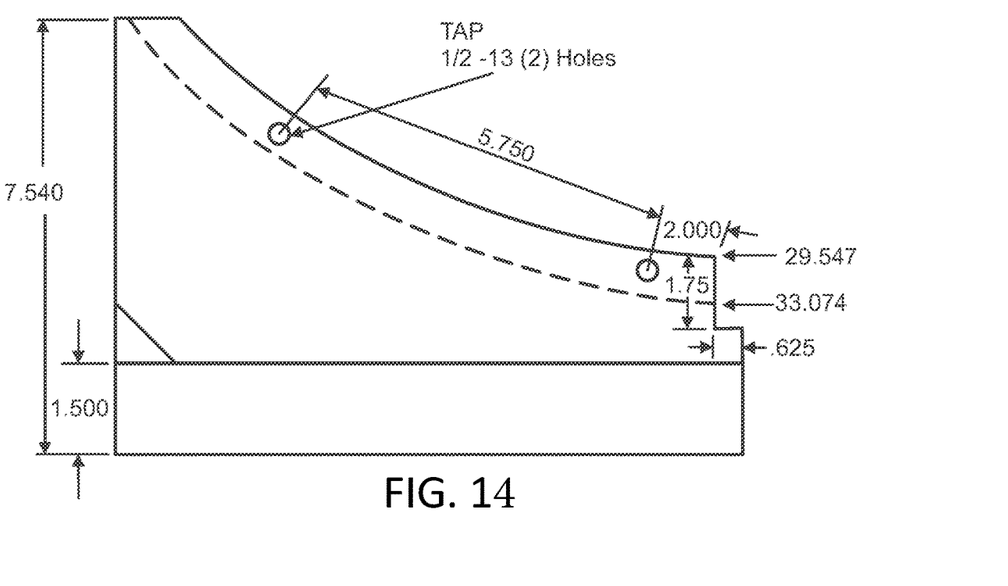
Figure 15:
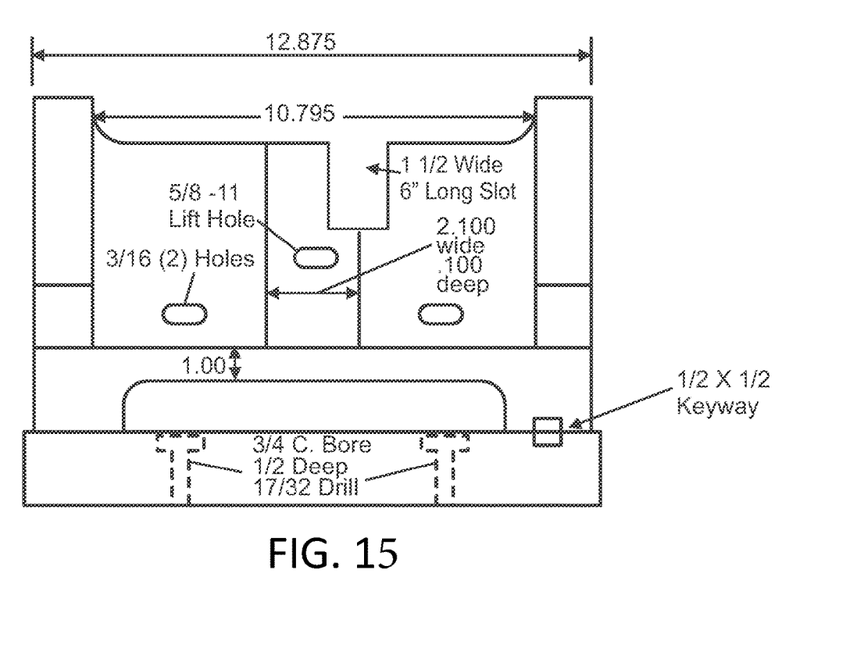
Figure 16:
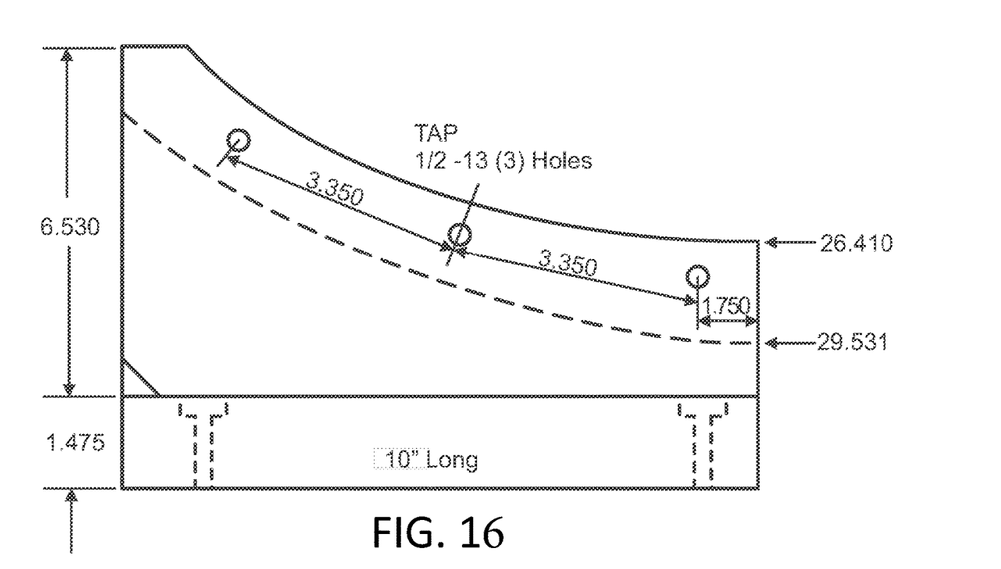
Figure 17:
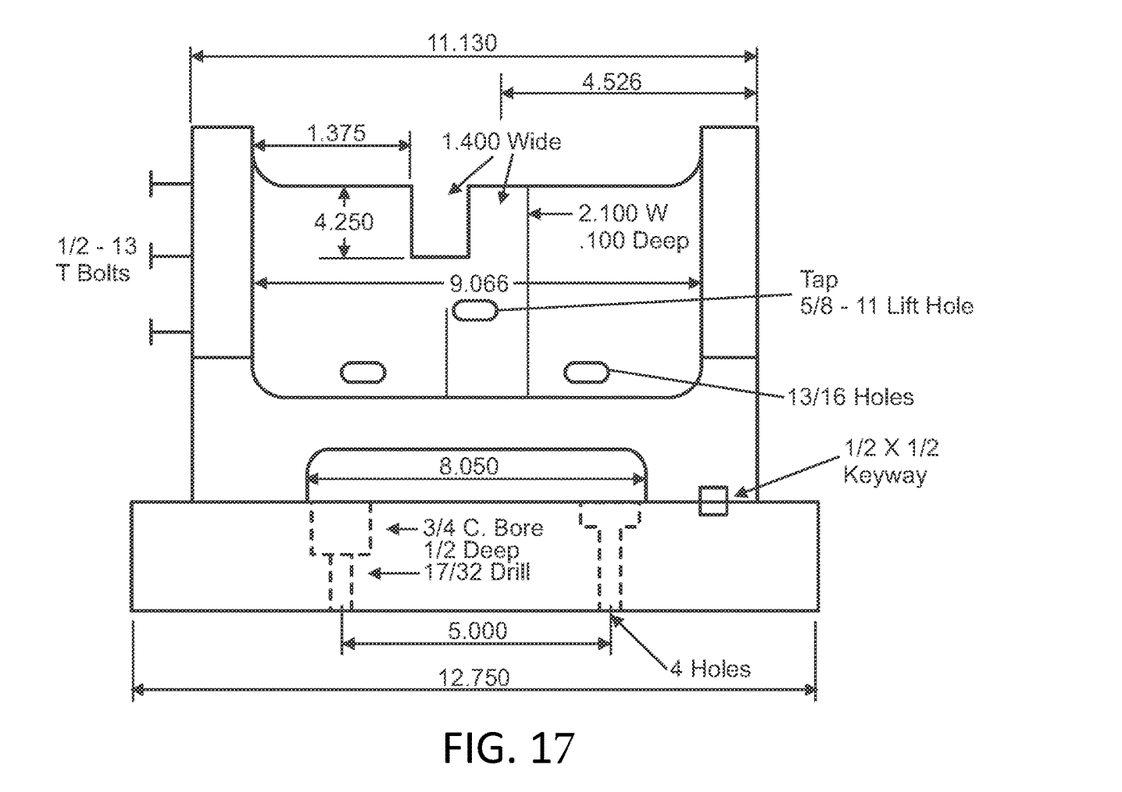

FIGS. 12-17 are schematic diagrams showing example dimensions of a tire mold maintenance and repair system 100 in accordance with embodiments of the present disclosure. Particularly, FIG. 12 shows a side view, FIG. 13 shows a front view, FIG. 14 shows another side view, FIG. 15 shows another front view, FIG. 16 shows another side view, and FIG. 17 shows another front view.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A mold maintenance and repair system comprising:
a mold holder configured to releasably attach to a support structure and to hold a mold, wherein the mold comprises contoured upper portion for molding an item and an attachment lower portion for attaching to the mold holder, wherein the support structure defines a groove, and wherein the attachment lower portion of the mold holder defines one or more features for fitting to and securing to the groove;
a threaded component for attaching to the groove; and
a screw for attaching to the threaded component for attaching the mold holder to the threaded component.

2. The system of claim 1, wherein the support structure is configured to support one or more mold holders.

3. The system of claim 1, wherein the mold is a tire mold.

4. The system of claim 1, wherein the support structure comprises a mill table.

5. The system of claim 1, further comprising one or more bolts for attaching the mold holder to the support structure.

6. The system of claim 1, further comprising one or more screws for affixing the mold holder to the support structure for securing the mold holder to the support structure.

7. A mold maintenance and repair system comprising:
a support structure configured to support one or more mold holders, wherein the support structure defines a groove;
a mold holder configured to releasably attach to the support structure and to hold a mold, wherein the mold comprises contoured upper portion for molding an item and an attachment lower portion for attaching to the mold holder, wherein the attachment lower portion of the mold holder defines one or more features for fitting to and securing to the groove;
a threaded component for attaching to the groove; and
a screw for attaching to the threaded component for attaching the mold holder to the threaded component.

8. The system of claim 7, further comprising one or more screws for affixing the mold holder to the support structure for securing the mold holder to the support structure.

9. A method for mold maintenance and repair, the method comprising:
providing a mold holder;
attaching the mold holder to a support structure, wherein the support structure defines a groove, and wherein the attachment lower portion of the mold holder defines one or more features for fitting to and securing to the groove;
attaching a mold to the mold holder, wherein the mold comprises a contoured upper portion for molding an item;
attaching a threaded component to the groove; and
using a screw to attach to the threaded component for attaching the mold holder to the threaded component.

10. The method of claim 9, wherein the support structure is configured to support one or more mold holders.

11. The method of claim 9, wherein the mold is a tire mold.

12. The method of claim 9, wherein the support structure comprises a mill table.

13. The method of claim 9, further comprising one or more bolts for attaching the mold holder to the support structure.

14. The method of claim 9, further comprising using one or more screws to affix the mold holder to the support structure for securing the mold holder to the support structure.

* * * * *